March 28, 1933.  J. LLOYD  1,903,186
LANDING GEAR FOR AIRCRAFT
Filed Aug. 6, 1931

Inventor:
John Lloyd,
By Mawhinney & Mawhinney,
Attys.

Patented Mar. 28, 1933

1,903,186

UNITED STATES PATENT OFFICE

JOHN LLOYD, OF COVENTRY, ENGLAND, ASSIGNOR TO SIR W. G. ARMSTRONG WHITWORTH AIRCRAFT LIMITED, OF COVENTRY, ENGLAND

LANDING GEAR FOR AIRCRAFT

Application filed August 6, 1931, Serial No. 555,616, and in Great Britain August 22, 1930.

This invention relates to landing gear for aeroplanes and other aircraft, of the kind having wheels, skids or the like landing member supported at the ends of an axle which is connected with the aircraft by means of a telescopic or collapsible resilient or damping arrangement sometimes known, and hereinafter referred to, as an "oleo-leg".

The primary object of the invention is to provide an improved arrangement of landing gear which will offer less air-resistance when the aircraft is in flight than the ordinary landing gear does.

According to this invention, the axle extends into the interior of the body and is there connected with an oleo-leg arranged within or to form a part of the body.

Figure 1:
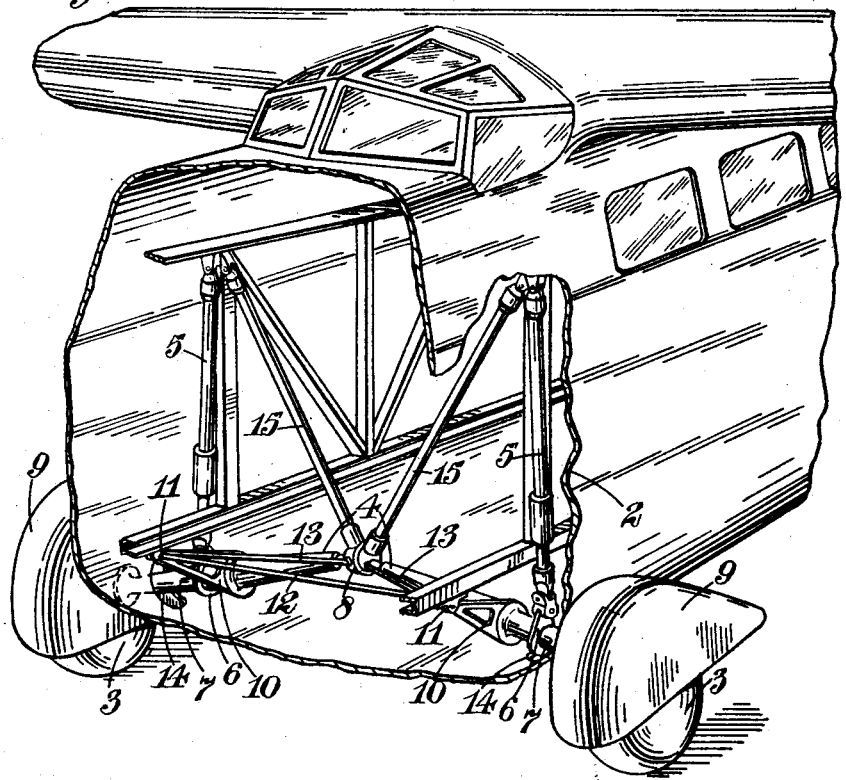
Figure 2:
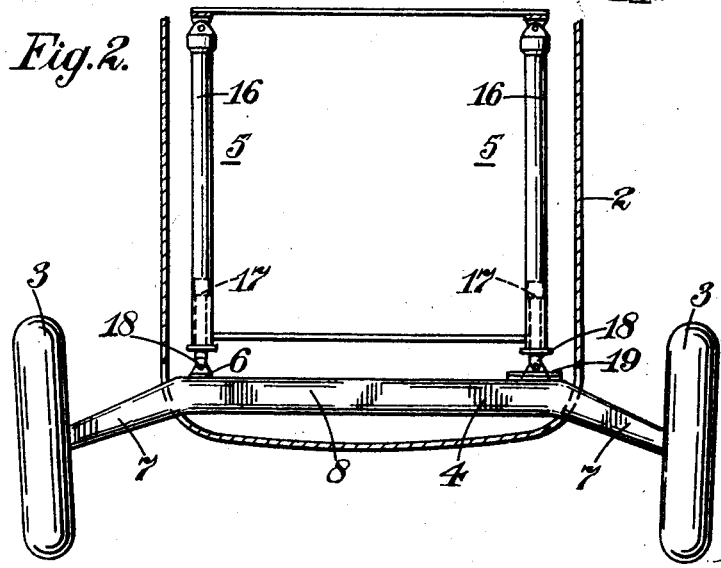

In the accompanying drawing,

Figure 1 is a perspective view of a part of an aeroplane with its landing gear adapted according to the invention, and Figure 2 is a front sectional view showing rather diagrammatically a modification.

Like numerals indicate like parts throughout the drawing.

In the construction illustrated in Figure 1, as applied to a monoplane having a substantially normal design of body 2, landing wheels 3, 3 are supported from the ends of an axle 4, and the central portion of the axle is disposed within the body. The oleo-legs 5, 5, instead of being mounted at the axle ends adjacent the wheels, are arranged within the body, being connected to the axle at 6, 6 just inside the body and pivoted at their upper ends to the frame.

When landing, the portions 7, 7 of the axle between the oleo-legs and the adjacent wheels are subjected to bending, by which means some of the landing shock is absorbed, the rest being transferred to the oleo-legs. For this reason it is desirable that the axle should be very robust.

By arranging for the axle to be arched as illustrated, with its centre 8 above its outer ends, it is an easy matter for an axle with wheels of ordinary size to pass through the lower edge of the body sides without the body being extended downwardly beyond a normal amount.

One advantage of a substantial axle is that wheel fairings 9, 9 can be mounted directly on it. Thus, no additional wind-resisting members are necessary for supporting the fairings. The fairings may be formed integrally with the axle.

The usual radius rods 10, 10 are shown connected to the axle near where the oleo-legs are connected to it, the rods extending forwardly to points 11, 11 where they are hinged on the frame, the rods also being arranged within the body. In like manner cross-bracing 12, 13 provided between the ends of the radius rods can also be arranged entirely within the body, thus further reducing wind-resistance.

Arcuate slots 14, 14 are provided in the body sides where the axle passes through to allow of the axle moving about the hinge points 11, 11 for the radius rods.

Obviously, instead of the axle consisting of a single member (as illustrated in Figure 2), it may comprise two parts, as shown in Figure 1, each being universally hinged at the centre 8 to frame members comprising struts 15, 15 connected to one another and to the cross-bracings 13, 13.

In the modification of Figure 2, a part of each oleo-leg 5, 5 is constituted by a strut of the frame or body which is capable of carrying load. For example, the outer shell 16 of each oleo-leg is shown as being rigidly connected at its upper and lower ends to the body frame, and the resilient or damping elements, which are acted upon by the movable piston 17, arranged internally of the shell. In this case, as the oleo-legs cannot pivot during landing, the axle is mounted on the movable pistons 17, 17 through hinged joints 18, 18 and provision is made for the axial sliding of the axle relatively to the oleo-legs, in order to allow of suitable movement of the landing wheels when landing on rough ground, when the axle would tilt. Thus, one of these hinges is fixed on and the other is slidable at 19 along the axle.

It will be evident that with this modification there is a saving in weight owing to the fact that one of the struts of the body constitutes the casing of the oleo-leg, in addition to the saving in wind-resistance.

What I claim as my invention and desire to secure by Letters Patent of the United States is:—

1. In combination with an aircraft body, a non-retractible landing gear comprising a landing member supported solely from the interior of the body, an axle supporting said landing member and terminating outside the body, said axle extending into the interior of the body, an oleo-leg in the interior of the body to which said axle is connected, a radius rod pivoted about a transverse axis, said rod also being arranged in the interior of the body and connected to said axle.

2. In combination with an aircraft body, a non-retractible landing gear comprising a landing member, an axle supporting said landing member outside the body, said axle extending into the interior of the body through an arcuate slot provided in the body wall, an oleo-leg in the interior of the body to which said axle is connected, a radius rod pivoted about a transverse axis, said rod being also in the interior of the body and connected to said axle.

3. In combination with an aircraft body, a landing gear comprising a landing member, an axle supporting said landing member exteriorly of the body, said axle extending through an opening in the wall of the body, means universally supporting the inner end of said axle within the body, an oleo-leg connected to said axle.

4. In combination with an aircraft body, a landing gear comprising a landing member, an axle supporting said landing member exteriorly of the body, said axle extending through an opening in the wall of the body, means universally supporting the inner end of said axle within the body, an oleo-leg connected to said axle, said oleo-leg being entirely within the body.

In testimony whereof I have signed my name to this specification.

JOHN LLOYD.